(12) United States Patent
Kimura et al.

(10) Patent No.: US 7,324,308 B2
(45) Date of Patent: Jan. 29, 2008

(54) DISK DRIVE, STORAGE MEDIUM, AND PORTABLE PRECISION DEVICE

(75) Inventors: Shinichi Kimura, Kanagawa (JP);
Hiroshi Matsuda, Kanagawa (JP);
Satoshi Matsumura, Kanagawa (JP);
Yuji Tamenori, Tokyo (JP)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 757 days.

(21) Appl. No.: 10/696,155

(22) Filed: Oct. 29, 2003

(65) Prior Publication Data

US 2004/0150909 A1    Aug. 5, 2004

(30) Foreign Application Priority Data

Oct. 30, 2002  (JP) ............................ 2002-316279

(51) Int. Cl.
*G11B 33/08*  (2006.01)
(52) U.S. Cl. .................................................. 360/316
(58) Field of Classification Search ............ 360/99.08;
248/632
See application file for complete search history.

(56) References Cited

U.S. PATENT DOCUMENTS

| | | | | |
|---|---|---|---|---|
| 5,004,207 A | * | 4/1991 | Ishikawa et al. ............ | 248/632 |
| 5,535,092 A | * | 7/1996 | Bang ........................... | 361/685 |
| 5,546,250 A | * | 8/1996 | Diel ........................ | 360/97.02 |
| 5,552,946 A | * | 9/1996 | Bicknese et al. ........ | 360/97.01 |
| 5,583,742 A | * | 12/1996 | Noda et al. .................. | 361/683 |
| 6,034,841 A | * | 3/2000 | Albrecht et al. ......... | 360/97.01 |
| 6,097,608 A | * | 8/2000 | Berberich et al. .......... | 361/752 |
| 6,283,438 B1 | * | 9/2001 | Shimada et al. ............ | 248/694 |
| 6,324,054 B1 | * | 11/2001 | Chee et al. ................. | 361/685 |
| 6,735,043 B2 | * | 5/2004 | Bernett et al. ........... | 360/97.01 |

FOREIGN PATENT DOCUMENTS

| | | |
|---|---|---|
| JP | 9231324 | 9/1997 |
| JP | 2002-1553 | 6/2000 |

* cited by examiner

*Primary Examiner*—A. J. Heinz
*Assistant Examiner*—Mark Blouin
(74) *Attorney, Agent, or Firm*—Bracewell & Giuliani LLP

(57) ABSTRACT

A disk drive having a remarkably improved shock resistance and conforming to a standard form factor is disclosed. A hard disk drive capable of detachably combined with a PC card is formed by assembling separate component parts including a functional unit 10 including a disk 11, a base plate 32 holding the functional unit 10, a frame bumper 30 disposed in a middle part of the assembly and serving as a shock-absorbing member, a card assembly 20 provided with a connector 22 to be connected to the slot of a PC card, and a top cover 33 covering the functional unit 10 held on the base plate 32. The frame bumper 30 receives lateral shocks that act on the side surfaces of the hard disk drive.

15 Claims, 7 Drawing Sheets

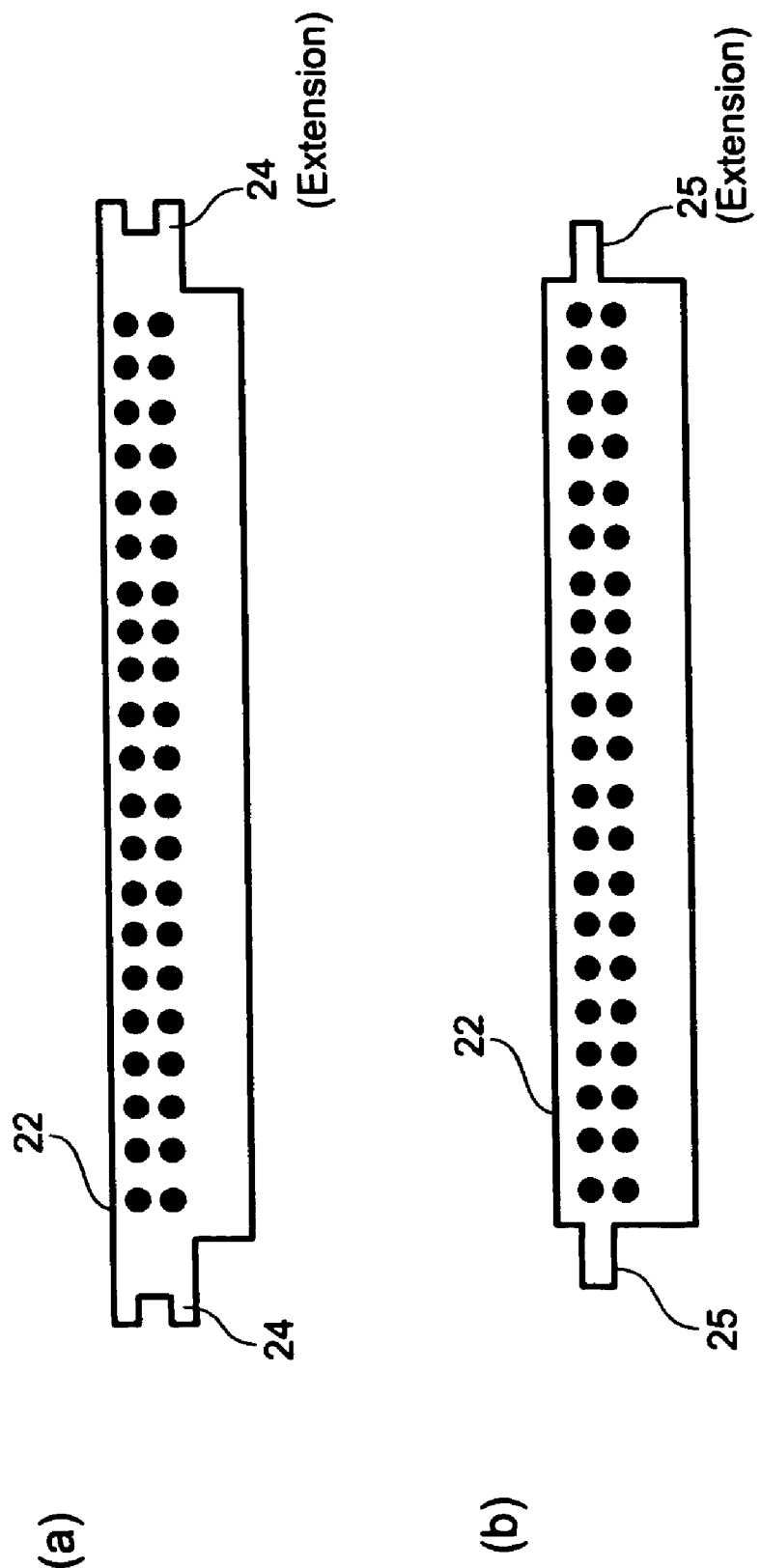

DISK DRIVE, STORAGE MEDIUM, AND PORTABLE PRECISION DEVICE

PRIORITY APPLICATION

This application claims priority to Japanese Patent Application No. JP2002-316279 (Hitachi Global Storage Technologies Docket No. JP920020172US1), filed on Oct. 30, 2002, and entitled "Disk Drive, Storage Medium and Portable Precision Device".

BACKGROUND OF THE INVENTION

1. Technical Field

The present invention relates to a disk drive used, for example, as a storage medium, and more particularly, to a disk drive having an enhanced shock resistance.

2. Description of the Related Art

Various portable storage mediums have been proposed for storing data in various devices including personal computers (PCs) and digital cameras. Efforts have been made to miniaturize those storage mediums and to increase the capacity of those storage mediums. For example, a new assembly structure of a portable hard disk drive (HDD) conforming to Compact Flash® (SanDisk Corporation), i.e., one of standards for small memory cards, has been proposed.

There has commercially been produced a portable, large-capacity subminiature hard disk drive. This hard disk drive uses a one-inch 1 GB disk and has a weight of only about 16 g. This portable, subminiature hard disk drive is provided, in addition to a magnetic disk (disk) for data storage, a spindle motor for driving the disk for rotation, a read/write head for reading and writing data from and to the disk, and an actuator for moving the read/write head across the disk.

The functional unit including the disk, the spindle motor, the read/write head and the actuator of this subminiature hard disk drive are formed very precisely for miniaturization. Therefore, if the hard disk drive is dropped or is struck against something, it is possible that the subminiature hard disk drive malfunctions. To solve such a problem, the applicant of the present patent application previously proposed a technique for effectively absorbing external shocks by shock absorbing members disposed in corners (four corners) of a disk drive. The technique proposed devises a guide groove for use in mounting the hard disk drive on another device to conform to the Compact Flash standards.

SUMMARY OF THE INVENTION

The precision of equipment has progressively been improved in recent years, and further enhancement of the shock resistance of portable hard disk drives has been required. Although prior art techniques place the shock-absorbing members in the four corners of a disk drive, it is desired that a device has a sufficient shock-absorbing function when shocks act on parts other than the four corners of the device, such as a case assembly where the side surface of the device is struck against a corner of something or a case assembly where secondary shocks act on the side surfaces or a bottom surface (or a top surface) after the device has been dropped and shocks have acted on the corners.

Furthermore, the hard disk drive must have a guide rail for use in inserting terminals specified by the Form Factor in an adapter (card) to conform to the Compact flash standards. Such a case assembly requires a necessary dimensional accuracy even if members, which are difficult to form in dimensions having variations within tolerances from standards, such as shock-absorbing members, are used for shock absorption.

The present invention has been made to solve the foregoing technical problems and it is therefore an object of the present invention to provide a disk drive having significantly improved shock resistance.

Another object of the present invention is to provide a disk drive having an improved shock resistance and not departing from the standards of the Form factor.

A third object of the present invention is to reduce tolerance conforming to standards and relating to the assembly of a guide rail and a connector to naught.

The present invention provides a disk drive, such as a portable hard disk drive, provided with a frame bumper to absorb shocks for the improvement of shock resistance. A new assembly structure is employed to improve shock resistance remarkably without departing from the Form Factor of, for example, the Compact flash type 2, a frame bumper is projected from all the side surfaces to enhance the shock-absorbing function of the functional unit. A disk drive according to the present invention comprises a functional unit including a disk as an information storage medium, and a case assembly holding the functional unit therein, wherein the case assembly is provided with a frame bumper formed of an elastomer, i.e., a thick shock-absorbing member, and the frame bumper has a surface protruding from the side surfaces of the disk drive beyond other members.

When the case assembly includes a top cover covering the upper surface of the disk drive, and the surface of the frame bumper protrudes beyond the surface of the top cover on the upper surface of the disk drive, shocks exerted on the upper surface are absorbed by the frame bumper and hence the disk drive has an improved resistance against shocks that are exerted on the upper surface. The case assembly is characterized in that the frame bumper of the case assembly has a guide function of detachably mounting the disk drive on an object.

Preferably, the disk drive further comprises a connector that is inserted in a slot formed in the object when the disk drive is mounted on the object, and the connector serves as part of the guide function, which forms a positioning part of the guide function without requiring additional parts and reduces the tolerance on the dimension of the assembly. In addition, the thickness of the case assembly in the direction of the frame bumper is dependent on a nut.

According to another aspect of the present invention, a storage medium having assembly structure capable of being detachably loaded into an object, such as a PC card, comprises a connector to be inserted in a slot formed in the object, and an elastic member forming an external shape not departing from a form factor that is required in mounting the storage medium to the object; wherein the positions of two-dimensional side surfaces of an external shape is dependent on the connector and the elastic member. Two-dimensional directions of the external shape are directions including an X-direction and a Y-direction, and excluding a direction along the thickness (Z-direction). The positions of the side surfaces are dependent on the most protruding part of the elastic member.

In the disk device, the elastic member is provided with a guide structure that is guided by and mounted on the object and the connector may be formed by molding integrally with the guide structure that is guided by and mounted on the object. When the elastic member is disposed in a middle part of the assembly structure, the elastic member exhibits an excellent shock-absorbing function when shocks are exerted in the Z-direction on the top cover or the bottom cover.

When the storage medium comprises a nut inserted through the elastic member in the direction of the thickness of the assembly structure and a screw for fastening the nut and the nut is fastened by a screw, the standards on the form factor can be satisfied even when the elastic member which is difficult to be formed in desired dimensions.

A portable precision device according to one aspect of the present invention including an assembly structure and capable of being detachably mounted on an object comprises a functional unit, a base plate for holding the functional unit, and a shock-absorbing member formed separate from the base plate and disposed in a middle part of the assembly structure; wherein lateral shocks acting on the portable precision device are absorbed by the shock-absorbing member.

It is preferable for the reduction of the cost of the portable precision device to form the base plate of the portable precision device not by die-casting aluminum, but by press-working a plate. The shock-absorbing member may be formed of resins by two-color molding, may have a protruding part protruding in the direction of the side surface of the portable precision device, and a guide rail may be formed to guide the portable precision device in mounting and removing the portable precision device on and from the object.

The portable precision device may further comprise a card assembly provided with a connector to be inserted in a slot formed in the object, and the connector may serve as part of a guide rail for guiding the portable precision device in mounting the portable precision device on the object. The portable precision device may further comprise a top cover for covering the functional unit after mounting the functional unit on the base plate, and the shock-absorbing member may have a part protruding upward from the upper surface of the top cover covering the functional unit. In the portable precision device, the functional unit may include a magnetic disk supported for rotation, and an actuator assembly for reading and writing data from and to the magnetic disk.

BRIEF DESCRIPTION OF THE DRAWINGS

FIGS. 7(a) and 7(b) are views of connectors in modifications.

DETAILED DESCRIPTION OF THE INVENTION

Figure 1:
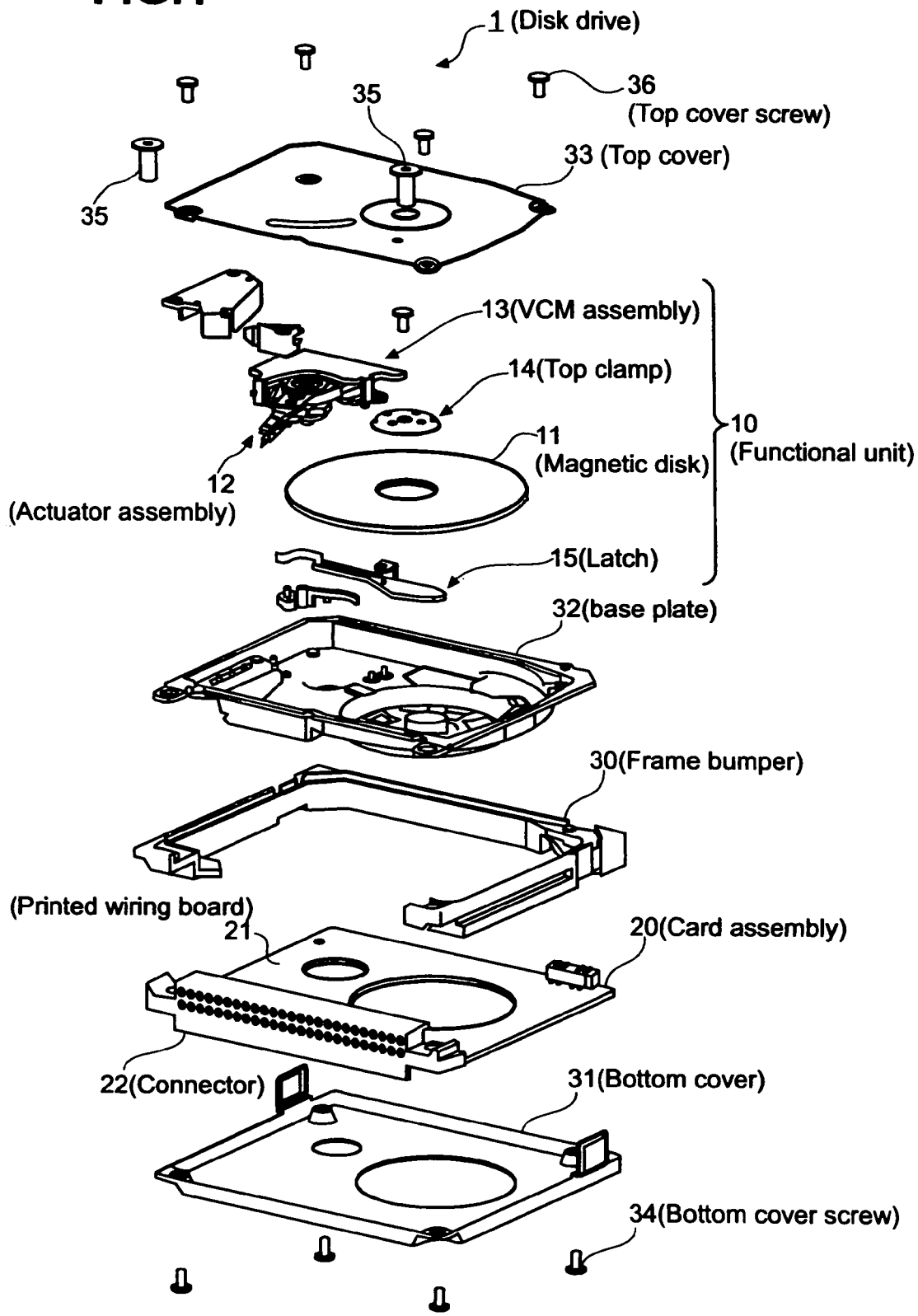
FIG. 1 is a view of assistance in explaining a disk drive in a preferred embodiment.

FIG. 1 is a view of assistance in explaining the assembly structure of a disk drive 1 in a preferred embodiment according to the present invention. The disk drive 1 as a storage medium and a portable precision device conforming to standards of Compact flash type 2, namely, standards for small memory cards, has a functional member 10, i.e., a driving unit (built-in unit), for writing and reading data, and a card assembly 20 forming circuits for controlling the driving of the functional unit 10 and data input/output. The functional unit 10 is held in a case assembly. The card assembly 20 has a connector (interface connector) 22 satisfying functions and construction specified by the form factor of standards of Compact flash type 2.

The functional unit 10 includes a magnetic disk (disk) 11, i.e., a storage medium for storing data, supported for rotation, an actuator assembly 12 supporting read/write heads for reading and writing data from and to the magnetic disk 11 on its free end part, a voice coil motor (VCM) assembly 13 for driving the actuator assembly 12, including a VCM coil and a VCM magnet, a top clamp 14 for fixedly holding the magnetic disk 11 mounted on a spindle motor, not shown, on the spindle motor, and a latch 15, such as a magnetic latch or an inertia latch, for stopping the heads at a predetermined position when the disk drive 1 is stopped.

The case assembly includes a frame bumper 30, i.e., an elastic member serving as a shock-absorbing member (shock damping member) having a form factor of Compact flash type 2, a bottom cover 31 supporting all the components of the disk device, a base plate 32 holding the components of the functional unit 10, and a top cover 33 covering the functional unit 10 placed in the base plate 32. The case assembly is provided with nuts 35 extending through the top cover 33, the base plate 32, the frame bumper 30 and the connector 22, and bottom cover fastening screws 34 screwed from under the bottom cover 31 through the base plate 32 and screwed in the nuts 35 to fasten the card assembly 20, the frame bumper 30, the bottom cover 31 and the top cover 33 to the base plate 32, and top cover fastening screws 36 fastening the top cover 33 to the base plate 32.

The base plate, corresponding to the base plate 32, of a conventional disk drive is formed by die-casting aluminum. Strength of an exposed die casting to withstand shocks is very weak. This embodiment employs the frame bumper 30 as a shock-absorbing member instead of a cast frame. Thus, the base plate 32 can be formed by press work, thick parts formed by casting can be replaced with the shock-absorbing parts of the frame bumper 30, and the base plate 32 can be made at a low cost. The base plate 32 may be formed by die-casting aluminum in a shape suitable for combining the frame bumper 30 with the base plate 32. It is desirable to form the base plate 32 by press work for mass production.

The frame bumper 30 is formed so as to utilize spaces available when the base plate 32 is formed by press work, and is a single molding having a shock-absorbing function and a side slot function required by Compact flash type 2. The frame bumper 30 is formed by molding, for example, a thermoplastic elastomer, such as a polyester elastomer, has moderate elasticity and is excellent in dimensional stability. The disposition of the frame bumper 30, i.e., a shock-absorbing member, in a middle part of the assembly structure is very effective in absorbing shocks exerted on either the top cover 33 or the bottom cover 31.

The frame bumper 30 is formed of resins by two-color molding. Since the frame bumper 30 needs to have both the function of a shock-absorbing member and the function of size slot, the frame bumper 30 has, for example, a core part formed of a hard resin having a comparatively high hardness, such as a polycarbonate resin or a nylon resin, and a body part formed of a soft resin having a comparatively low hardness, such as a polyester elastomer. The formation of the frame bumper 30 by two-color molding further improves the shock resistance of the frame bumper 30. Since the base plate 32 is formed of a metal, a sufficient space is necessary in view of strength if the frame bumper 30 is formed integrally with the base plate 32 by insert molding. Since the frame bumper 30 and the base plate 32 are formed separately, two-color molding is employed in a narrow space.

The top cover 33 is fastened to the base plate 32 by screwing the four top cover fastening screws 36 in threaded holes formed in the base plate 32. The frame bumper 30, the card assembly 20 and the bottom cover 31 are fastened together by screwing the two bottom cover fastening screws 34 in a threaded holes formed in the base plate 32. A part, on the side of the connector 22, of the card assembly 20 is fastened to the base plate 32 by screwing the bottom cover fastening screws 34 in the nuts 35.

Figure 2:
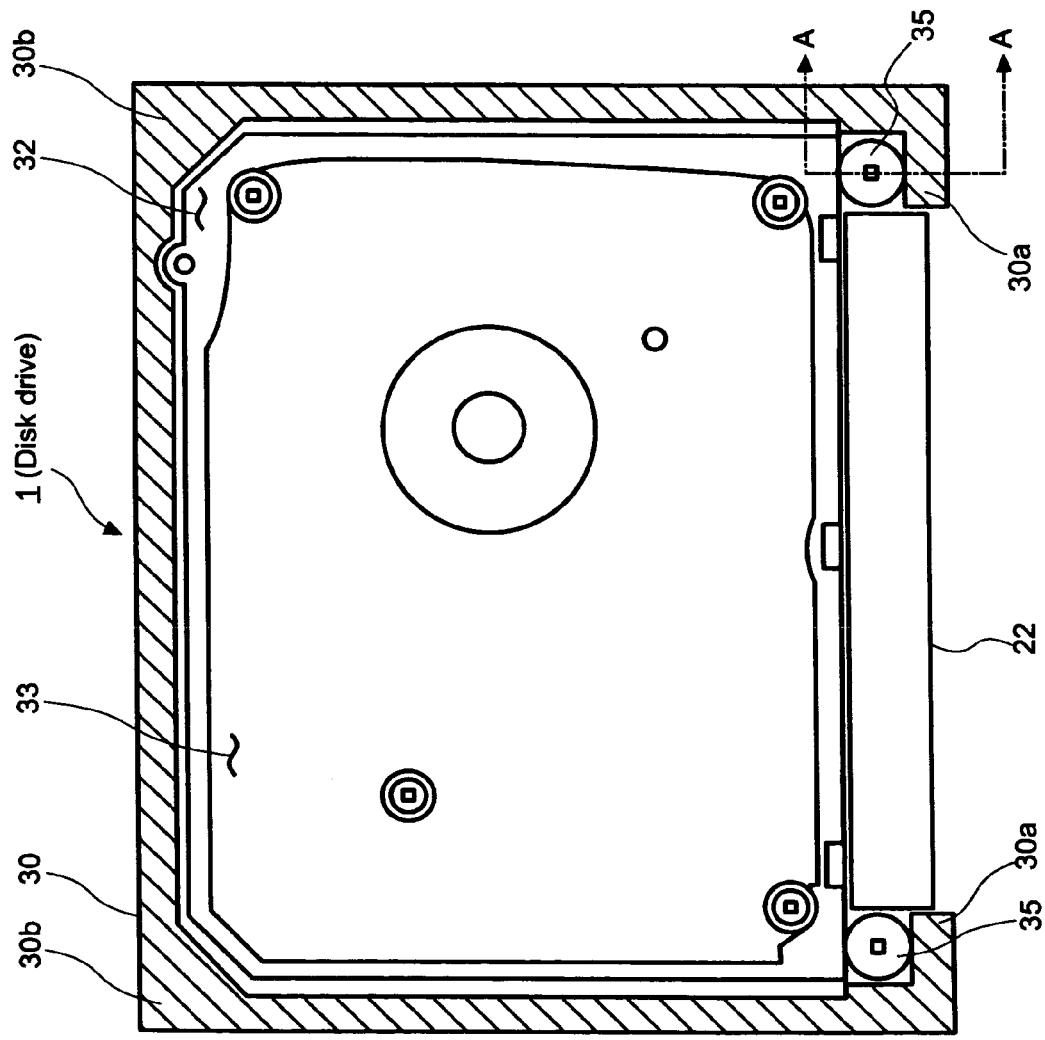
FIG. 2 is a plan view of the disk drive shown in FIG. 1.

FIG. 2 is a plan view of the disk drive 1 formed by assembling the component members shown in FIG. 1. When the disk drive 1 in this embodiment is assembled, the frame bumper 30, i.e., a shock-absorbing member, surrounds the side surfaces of the disk drive 1. The frame bumper 30 is designed in dimensions such that parts of the frame bumper 30 protrude by a width in the range of 0.5 to 1 mm from the side surfaces of the base plate 32, and has parts 30a protruding by a width in the range of 0.5 to 1 mm from the outer side surface of the connector 22. The frame bumper 30 has thick corner parts 30b, which is most likely to be exposed to shocks. Thus, the disk device 1 can be protected from lateral shocks that are exerted on the side surfaces of the disk drive 1 by covering the periphery (side surface in the two-dimensional direction of the external shape) with the bumper frame 30.

Figure 3:
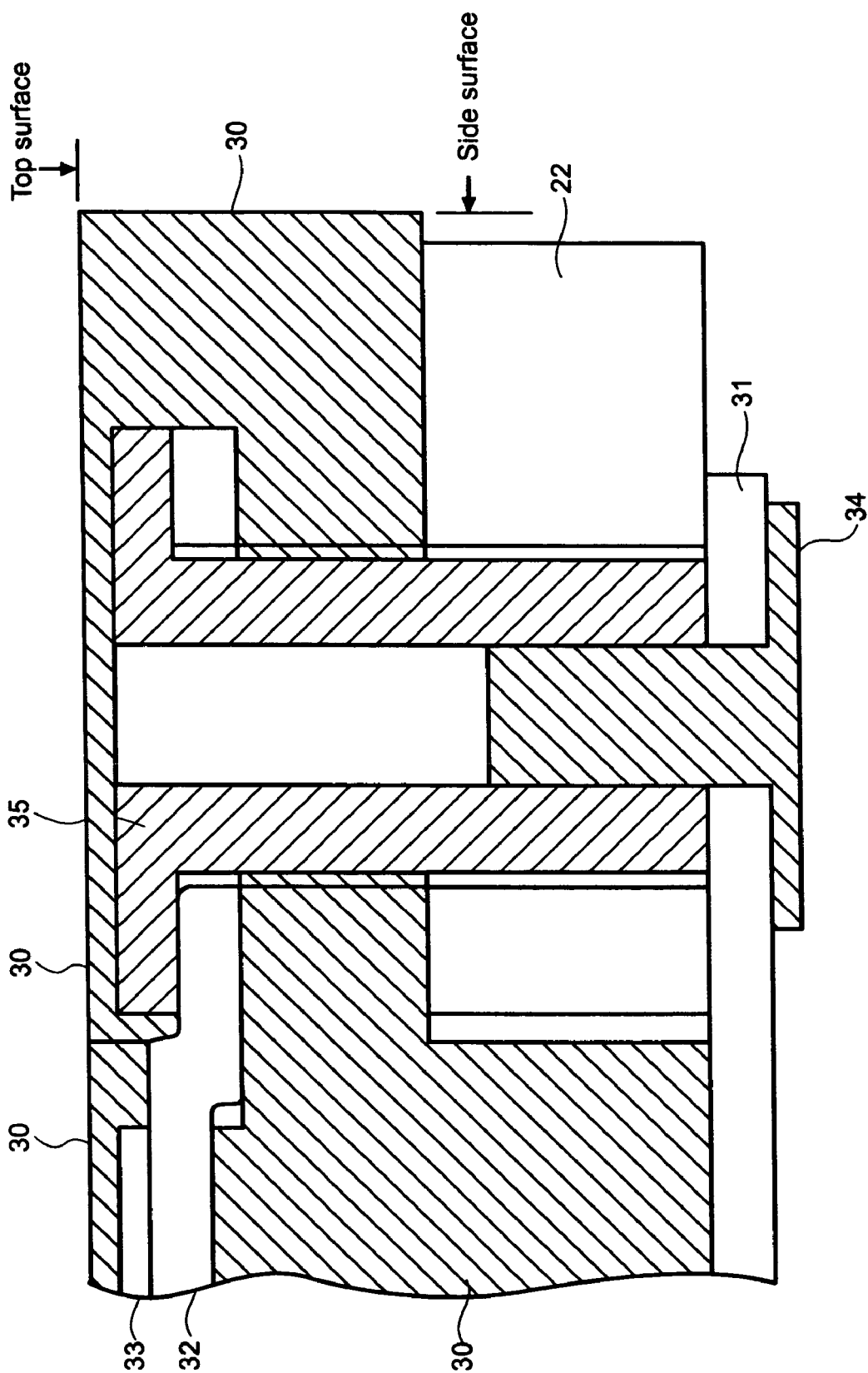
FIG. 3 is a sectional view taken on line A-A in FIG. 2.

FIG. 3 is a sectional view taken on line A-A in FIG. 2. As shown in FIG. 3, the bottom cover fastening screw 34 is screwed in the nut 35. The nut 35 formed of a hard material, such as a metal, is extended through the base plate 32, the frame bumper 30 and the connector 22 and determines the distance between the base plate 32 and the bottom cover 31. Thus, the base plate 32 and the bottom cover 31 can be joined together in accurate dimensions even though the frame bumper 30, i.e., a shock absorbing member, is soft.

As obvious from FIG. 3, the side surface of the frame bumper 30 protrudes outward beyond the connector 22 to enhance the shock-absorbing function against lateral shocks. The nut 35 has a head sunk in the upper surface of the frame bumper 30 so that the surface of the frame bumper 30 protrudes outward beyond the other members. More specifically, the surface of the frame bumper 30 protrudes outward beyond the other members by a width of, for example, 0.1 mm or above. Therefore, the frame bumper 30 is effective in absorbing vertical shocks that may act directly on the top cover 33.

The disk device 1 of the form factor conforming to the standards of Compact flash type 2 is easy to carry and highly portable and is capable of absorbing shocks that may act on the main part thereof when the disk device 1 is dropped. The parts of the frame bumper 30 forms the periphery of the disk drive, and the connector 22, the base plate 32 and the top cover 33 lie on the inner side of planes including the outer surfaces of the frame bumper 30. Therefore, the frame bumper 30 strikes the floor or the like first when the disk drive 1 is dropped, and hence shocks that act on the main part of the disk drive 1 is limited at a minimum.

The construction of the connector 22 of the disk drive in this embodiment will be described below. FIGS. 4(a) and 4(b) are views of assistance in explaining the connection of the disk drive 1 to a PC card 2, i.e., an object. FIG. 4(a) shows the relation between the disk drive 1 and the PC card 2, and FIG. 4(b) is a view taken from a direction opposite a direction from which FIG. 4(a) is taken. The PC card 2 in which the disk drive 1 is inserted, similarly to the disk drive 1, conforms to the standards of Compact flash type 2. The disk drive 1 is inserted in the PC card 2 in the direction of the arrow shown in FIG. 4(a). As shown in FIG. 4(b), the PC card 2 is provided with a slot 41 in which the connector 22 of the disk drive 1 is connected, and guide rails 42 for guiding the disk drive 1.

Figure 5:
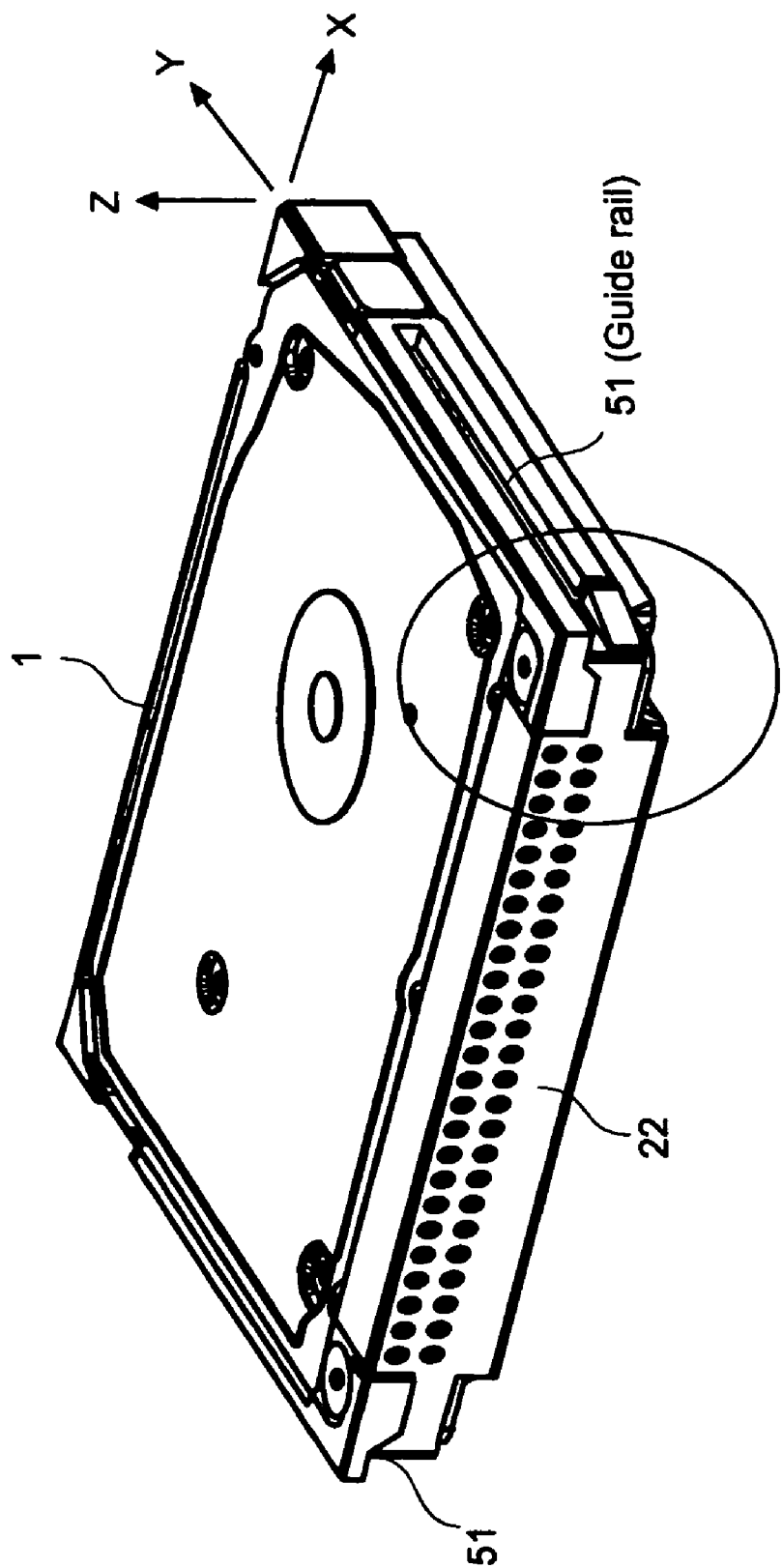
FIG. 5 is a perspective view of the disk drive as viewed from the side of a connector.
Figure 6:
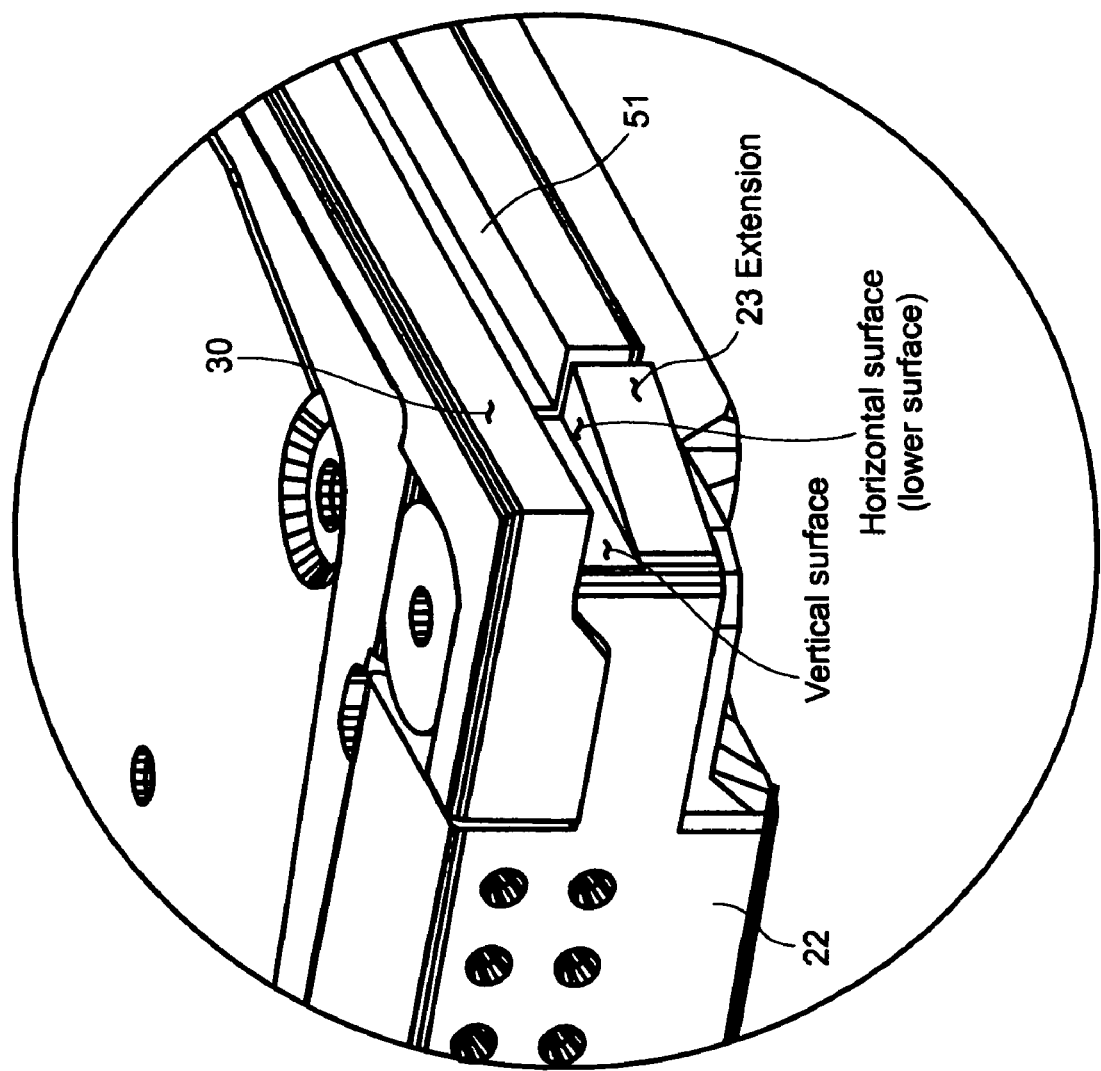
FIG. 6 is an enlarged view of a corner part surrounded by a circle in FIG. 5.

FIGS. 5 and 6 are views of assistance in explaining the construction of the connector 22 of the disk drive 1. FIG. 5 is a perspective view of the disk drive 1 taken from the side of the connector 22, and FIG. 6 is an enlarged view of a corner part surrounded by a circle in FIG. 5. As shown in FIG. 5, the connector 22 having about fifty pins and conforming standards is disposed on one end surface (side surface) of the disk drive 1, and guide rails 51 corresponding to the guide rails 42 are formed on the opposite side surfaces of the disk drive 1. In this embodiment, opposite end parts of the connector 22 is extended so as to form parts of the guide rails 51.

Figure 4:
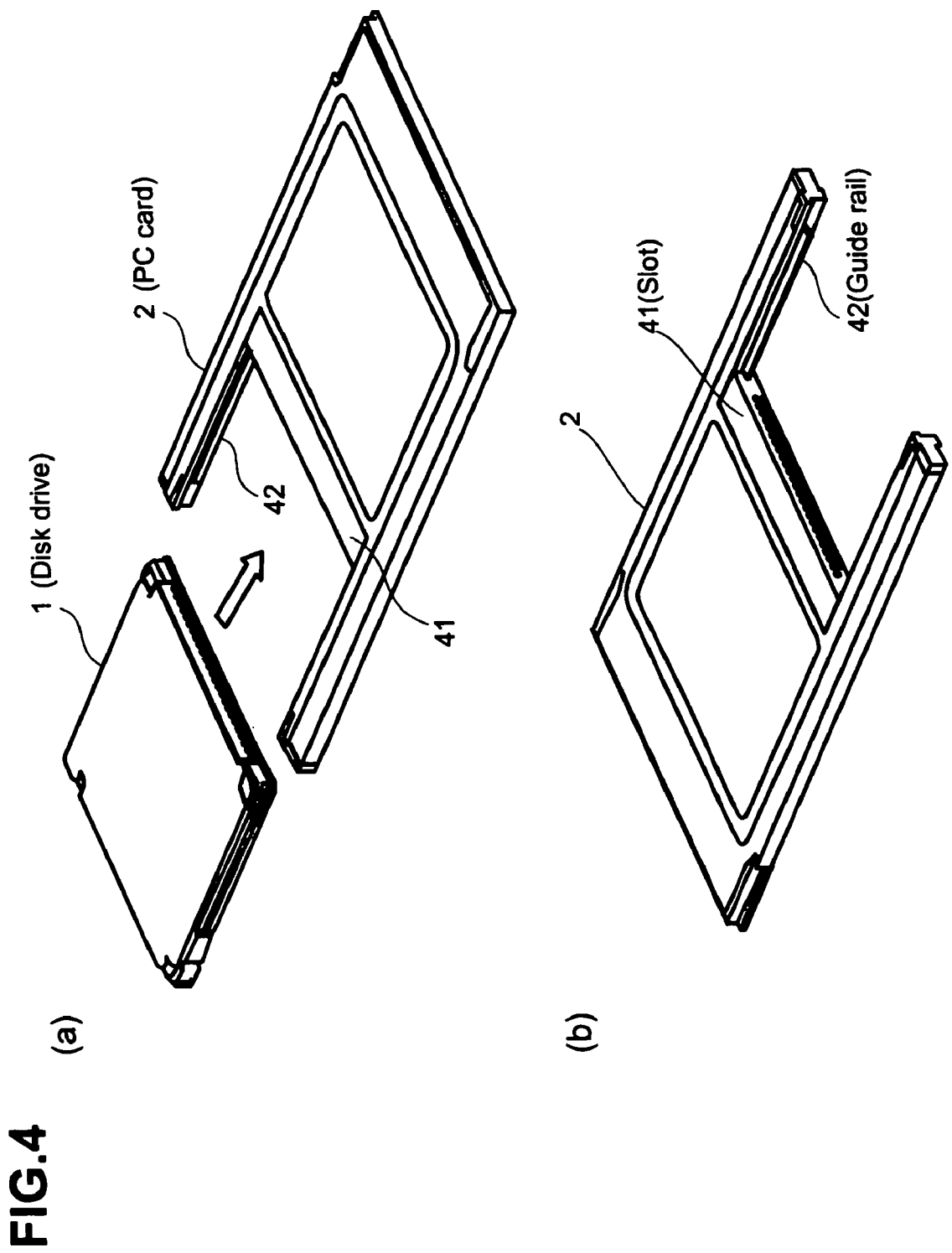
FIGS. 4(a) and 4(b) are views of assistance in explaining the relation between a disk drive and a PC card in combining disk drive with the PC card.

As shown in FIG. 6, the connector 22 formed of a resin has extensions 23 forming the guide rails. For example, the disk device 1 must have a guiding function to guide the connector 22 so that the terminals of the connector 22 may be connected to those of the adapter card (PC card 2) to make the product conform to the standards of Compact flash. In the conventional disk drive, the guide rails 51 and the connector 22 are separate parts, and hence the positional relation between the terminals of the connector 22 and the guide rails is dependent on tolerances in the dimensions of those parts and in the dimensions of the assembly of those parts. Therefore, severe tolerances in the dimensions of those parts and the assembly of those parts must be determined to insert the terminals of the connector 22 correctly in the slot 41 as shown in FIG. 4.

In this embodiment, the connector 22 has the extensions 23 and the guide rails 51 are formed integrally with the extensions 23. Therefore, the disk drive can be formed in satisfactory dimensional accuracy without determining any tolerances in the dimensions of parts forming the guide rails 51 and the assembly of parts, which is effective in reducing the cost of the product. The guide rails 51 of the conventional disk drive are formed in a desired dimensional accuracy by machining the base formed by die-casting aluminum. Since parts of the guide rails are formed in the connector 22 of a resin in this embodiment, a machining process is omitted, which further reduces the cost.

In this embodiment, a function of the frame bumper 30 of a shock-absorbing material is used as a part of the guide rails 51. Generally, it is difficult to form part of a shock-absorbing material in dimensions within the tolerance and it is difficult to form the guide rails 51 entirely of a shock-absorbing material. In this embodiment, parts, corresponding to the front end of the connector 22 and the guide rails 42 of the PC card 2, of the guide rails 51, the dimensional accuracy of which is particularly important, are formed integrally with the connector 22 by molding, and the other parts of the guide rails 51 are formed in the frame bumper 30. The distances between the positions of the pins of the connector 22 and a vertical surface shown in FIG. 6 are particularly important. Since the vertical surface is the surface of a part of the connector 22 formed by molding, the distances can accurately be determined. Thus, the disk drive is formed with a desired dimensional accuracy and has an improved shock resistance.

In FIG. 6, the extension 23 having a horizontal surface (lower surface) and part of the vertical surface is formed integrally with the connector 22 by molding, and the other horizontal surface (upper surface) is formed in the frame bumper 30. A front end part of the extension 23 is beveled in a horizontally triangular shape. Thus, the frame bumper 30 having a guide function can be protruded beyond the extension 23. Thus, the shock absorbing function of the corner part is enhanced, the insertion of the disk drive in alignment with the guide rails 42 is facilitated by the triangular front end part of the extension 23.

The X-, the Y- and the Z-direction are defined in FIG. 5. The X- and the Y-direction define the horizontal direction, and the Z-direction along the thickness is the vertical direction. In this embodiment, the frame bumper 30 and the connector 22 cover the two-dimensional direction defined by the X- and the Y-direction. As shown in FIG. 2, the peripheral part of the frame bumper 30 protrudes most greatly with respect to the two-dimensional direction defined by the X- and the Y-direction. Thus, the lateral shocks that act on the side surfaces of the disk drive are absorbed by the frame bumper 30.

FIGS. 7(a) and 7(b) show connectors 22 in modifications of the foregoing connector 22. The connector 22 shown in FIG. 7(a) has extensions 24 each provided with a groove defined by upper and lower horizontal surfaces and a vertical surface. The connector 22 shown in FIG. 7(b) has extensions 25 each provided with a longitudinal guide rail. The connector 22 of the shape shown in FIG. 7(a) is satisfactory if shock resistance can be sacrificed to some extent. The connector 22 of the shape shown FIG. 7(b) is satisfactory if it is desired to enhance shock resistance and many shock-absorbing protruding parts of the frame bumper 30 are used. Since the connector 22 shown in FIG. 7(b) is provided integrally with the longitudinal guide rails having guide surfaces, the positional alignment of the holes of the connector 22 and the pins of the slot of the PC card 2 is possible.

As apparent from the foregoing description, the frame bumper 30 improves the shock resistance of the removable hard disk drive (the disk drive 1) having, for example, the form factor of Compact flash type 2. For example, shocks that will act on the main part of the disk drive 1 when the disk drive 1 is dropped can effectively be absorbed by forming the frame bumper 30 such that parts of the frame bumper 30 strike the floor first. Although the parts of the frame bumper 30 are naturally the outermost parts on the side of the slot, the connector 22, i.e., an interface, and the base plate 32 recede inside from the outer boundary of the frame bumper 30 to enhance the shock resistance.

The connector 22 in this embodiment has the extensions 23 (24, 25) as positioning slots. The positioning slots having desired dimensions of the conventional disk drive are formed by machining a base formed by die-casting aluminum. The base plate 32 of the present invention does not have any positioning function, the base plate 32 can be formed by low-cost press work. Even if the connector 22 has a positioning function, the connector 22 can be formed so as to recede inside the outer boundary of the frame bumper 30. Therefore, the frame bumper 30 strikes the floor first even if the disk drive is dropped with the connector 22 facing down, so that the shock resistance can be improved.

As apparent from the foregoing description, according to the present invention, the disk drive has a remarkably improved shock resistance against shocks that may act on the disk drive when the disk drive is dropped.

What is claimed is:

1. A disk drive, comprising:
    a functional unit including a disk serving as an information storage medium and defining x, y and z directions;
    a case assembly holding the functional unit therein; wherein
    the case assembly is provided with a thick frame bumper serving as a shock-absorbing member, and a surface of the frame bumper protrudes from side surfaces of the disk drive beyond other members, and the frame bumper is formed from a core material having a high hardness and an elastic material having a relatively lower hardness than the core material; and wherein
    a two-piece fastener for the case assembly comprising a screw and a nut, the functional unit attached to an electrical connector, wherein both pieces of the two-piece fastener assembly extend through the electrical connector, and wherein the nut is covered by the bumper.

2. The disk drive of claim 1, wherein the case assembly includes a top cover located an upper z direction end and covering an upper surface of the disk drive, the surface of the frame bumper protrudes in the z direction beyond a surface of the top cover on the upper surface of the disk drive, and the frame bumper protrudes in the x and z directions by a distance in a range of 0.5 to 1 mm.

3. The disk drive of claim 1, wherein the frame bumper of the case assembly has a pair of guide rails that perform a guide function of detachably mounting the disk drive in a PC card.

4. The disk drive of claim 3, further comprising a connector inserted in a slot formed in the PC card when the disk drive is mounted in the PC card; and wherein
    both the frame bumper and the connector serve the guide function of detachably mounting the disk drive in the PC card.

5. The disk drive of claim 1, wherein the elastic material is formed from a polyester elastomer, and the core material is formed from a polycarbonate or nylon resin.

6. A disk drive defining x, y, and z directions and having an assembly structure capable of being detachably loaded into a PC card, comprising:
    a connector for insertion in a slot formed in the PC card, the connector having tapered guide features that provide a guiding function for the storage medium relative to the PC card;
    an elastic member forming an external shape not departing from a form factor that is required in mounting the disk drive to the PC card; and wherein
    positions of two-dimensional side surfaces of an external shape is dependent on the connector and the elastic member, and the elastic member extends beyond an assembly structure of the disk drive in the x and z direction.

7. The storage medium of claim 6, wherein the elastic member is provided with guide rails that align with the tapered guide features of the connector in the y direction and are guided by and mounted to the PC card.

8. The storage medium of claim 6, wherein the elastic member has parts protruding from all of the two-dimensional side surfaces beyond other members in the x, y, and z directions, and protrudes in the x and z directions by a distance in a range of 0.5 to 1 mm.

9. The storage medium of claim 6, wherein the elastic member is disposed in a middle part of the assembly structure and is formed from a core material having a high hardness and an elastomer having a relatively lower hardness than the core material.

10. The storage medium of claim 6, further comprising:
    a nut inserted through the elastic member and through the connector in the z direction;

a screw for fastening the nut; and wherein
a form factor in the z direction is determined by fastening the nut by the screw.

11. A portable precision device including an assembly structure and capable of being detachably mounted on an object, the portable precision device comprising:
a functional unit defining x, y, and z directions, and having a top cover and a connector;
a base plate for holding the functional unit, the base plate being located opposite the top cover in the z direction;
a shock-absorbing member formed separate from the base plate and disposed in a middle part of the assembly structure such that the shock-absorbing member protrudes beyond the top cover in the z direction; and wherein
both lateral and vertical shocks acting on the portable precision device in the x, y, and z directions are absorbed by the shock-absorbing member;
wherein a two-piece fastener for the case assembly comprising a screw and a nut, the functional unit attached to an electrical connector, wherein both pieces of the two piece fastener assembly extend through the electrical connector, and wherein the nut is covered by the bumper.

12. The portable precision device of claim 11, wherein the shock-absorbing member is formed of resins comprising a elastic material of polyester elastomer, and a core material formed from a polycarbonate or nylon resin, and the shock-absorbing member protrudes beyond the top cover in the z direction by a distance in a range of 0.5 to 1 mm.

13. The portable precision device of claim 11, wherein the shock-absorbing member has guide rails protruding therefrom in the x direction and extending along a side surface of the portable precision device in the y direction, and the guide rails guide the portable precision device in mounting and removing the portable precision device on and from the object.

14. The portable precision device of claim 13, further comprising a card assembly provided with the connector for insertion in a slot formed in the object; and wherein
the connector has tapered guide members that serve with the guide rails for guiding the portable precision device in mounting the portable precision device on the object.

15. The portable precision device of claim 11, wherein the functional unit includes a magnetic disk supported for rotation, and an actuator assembly for reading data from the magnetic disk and writing data to the magnetic disk.

* * * * *

UNITED STATES PATENT AND TRADEMARK OFFICE
CERTIFICATE OF CORRECTION

PATENT NO. : 7,324,308 B2 Page 1 of 1
APPLICATION NO. : 10/696155
DATED : January 29, 2008
INVENTOR(S) : Shinichi Kimura et al.

It is certified that error appears in the above-identified patent and that said Letters Patent is hereby corrected as shown below:

Col 8, Ln 65: after claim 6, add --wherein the fastner assembly--
Col 8, Ln 65: delete "comprising" and replace with --comprises--
Col 8, Ln 67: after z direction; add --and--
Col 9, Lns 1-3: delete "; and wherein a form factor in the z direction is determined by fastening the nut by the screw"

Signed and Sealed this

Third Day of June, 2008

JON W. DUDAS
*Director of the United States Patent and Trademark Office*